United States Patent [19]

Nishiwaki et al.

[11] 3,894,071

[45] July 8, 1975

[54] PROCESS FOR PRODUCING DIAMINOMALEONITRILE

[75] Inventors: Eiji Nishiwaki, Arai; Shigeharu Yamazoe, Tokyo; Mitsuyuki Hoshino, Urawa; Sadafumi Yoshino; Katsunori Mikuma, both of Kurashiki, all of Japan

[73] Assignee: Nippon Soda Company, Limited, Japan

[22] Filed: Sept. 26, 1973

[21] Appl. No.: 400,858

[30] Foreign Application Priority Data
Dec. 11, 1972 Japan.............................. 47-123381
Sept. 29, 1972 Japan.............................. 47-97139

[52] U.S. Cl.......................................... 260/465.5 R
[51] Int. Cl.................... C07c 121/42; C07c 121/02
[58] Field of Search ............................. 260/465.5 R

[56] References Cited
UNITED STATES PATENTS

| | | | |
|---|---|---|---|
| 3,551,473 | 12/1970 | Hartter.......................... | 260/465.5 R |
| 3,629,318 | 12/1971 | Webster........................ | 260/465.5 R |
| 3,666,787 | 5/1972 | Webster........................ | 260/465.5 R |
| 3,701,797 | 10/1972 | Okada et al................... | 260/465.5 R |
| 3,714,222 | 1/1973 | Hartter.......................... | 260/465.5 R |

*Primary Examiner*—Joseph P. Brust
*Attorney, Agent, or Firm*—George B. Oujevolk

[57] ABSTRACT

A process for tetramerizing hydrogen cyanide to diaminomaleonitrile wherein hydrogen cyanide is polymerized in the presence of a basic material as a catalyst and a polar solvent as its solvent and alkyl mercaptan is added into the reaction mixture producing the said diaminomaleonitrile.

9 Claims, No Drawings

3,894,071

PROCESS FOR PRODUCING DIAMINOMALEONITRILE

BACKGROUND OF THE INVENTION

This invention relates to a process for producing diaminomaleonitrile (tetramer of hydrogen cyanide). Diaminomaleonitrile is a useful chemical product in the chemical industry as a raw material for various organic materials, especially as an intermediate for synthesis of glycine, adenine, 4-aminoimidazole-5-carboxyimide or the like.

According to a conventional process for producing diaminomaleonitrile, German Open Patent No. 2,022,243 discloses a process which comprises using a basic material such as NaCN, KCN, NaOH or $(C_2H_5)_3N$ as a catalyst in a solvent, i.e. dimethyl sulfoxide (hereinafter, this is abbreviated as DMSO alone) and/or dimethylformamide and then polymerizing hydrogen cyanide by maintaining the reaction mixture at a pH value of 10 ± 1 and thereby obtaining diaminomaleonitrile with a yield of 37 to 64 %.

Further, Japanese Open Patent Publication No. 2917/1971 discloses a process which comprises polymerizing hydrogen cyanide at a temperature ranging from about −40°C to +25°C in the presence of a basic catalyst such as trimethylamine, together with a co-catalyst, i.e., one or more of dicyan and diiminosuccinonitrile and thereby, obtaining diaminomaleonitrile with a yield of 16 to 63 %.

The above mentioned processes produce the desired compound with a low yield, so that the said compound, i.e., diaminomaleonitrile obtained is expensive and consequently, useful chemicals such as glycine, adenine, or 4-aminoimidazole-5-carboxyimide which are synthesized from the said diaminomaleonitrile are expensive. So, those processes are economically unattractive.

BRIEF SUMMARY OF THE INVENTION

The process of the present invention is a method which comprises using a polar solvent as the solvent and adding a basic material as a catalyst to a reaction mixture and thereby producing diaminomaleonitrile by polymerizing hydrogen cyanide and further, adding alkyl mercaptan into the reaction mixture thereby producing the said diaminomaleonitrile and accelerating the reaction and simultaneously improving its yield.

A condition for obtaining diaminomaleonitrile from hydrogen cyanide with a high yield rate is to accelerate the velocity of converting hydrogen cyanide into diaminomaleonitrile and simultaneously, to control the secondary reaction converting hydrogen cyanide into a high molecular material.

It is the object of this invention to overcome the aforementioned problems and disadvantages and provide an improved process for producing diaminomaleonitrile.

Other and further objects, features and advantages of this invention will appear more fully from the following description.

DETAILED DESCRIPTION

The inventors scrutinized those conventional economically poor processes for producing diaminomaleonitrile and carried out various researches as to a method for improving those drawbacks; and thereby discovered a process for obtaining diaminomaleonitrile with one third of convention reaction time and a surprising high yield rate and thus, accomplished completely the present invention.

As a useful solvent in producing diaminomaleonitrile in accordance with present invention, a non-protonic, polar solvent, for example, dimethylsulfoxide (DMSO), dimethyl formamide, dimethyl acetoamide, hexamethyl phosphoroamide and mixtures thereof are preferred.

Further, as a basic catalyst, alkali cyanide, alkali hydroxide, ammonia, trialkyl amine or the like may be employed.

As an alkyl mercaptan, i.e., an additive in a reaction mixture methyl mercaptan, ethyl mercaptan, propyl mercaptan, butyl mercaptan, pentyl mercaptan, hexyl mercaptan, heptyl mercaptan, octyl mercaptan and mixtures thereof are employed.

A reaction temperature is selected in a range of 15°C to 100°C and the reaction may be completely finished during a time of about two hours or less.

The reaction time and yield rate are variable depending upon the concentrations of basic catalyst and alkyl mercaptan in the polar solvent; and if concentrations of both components, i.e., the basic catalyst and alkyl mercaptan are increased, in so far as optimum concentrations are maintained, as a general tendency the yield rate will be improved and the reaction time will be curtailed.

But, in the case of selecting very high concentration of both components, i.e., the basic catalyst and alkyl mercaptan in the polar solvent, the reaction occurs in a short time and it is feared that a too vigorous reaction may take place.

In performing the process of the present invention, preferably, an addition amount of the basic catalyst is chosen in range of 0.1 to 15 and more preferably 0.1 to 10 wt. % and an addition amount of alkyl mercaptan is chosen in a range of 0.1 to 8 wt. % in proportion to the polar solvent.

More preferably, the basic catalyst in a range of 2.5 to 7.5 wt. % and alkyl mercaptan in a range of 0.5 to 2.5 wt. % are selected in proportion to the polar solvent.

Generally, even if an addition amount of the basic catalyst is chosen in the range of 2.5 to 7.5 wt. % in proportion to the polar solvent, in the case of employing 2.5 wt. % or more of alkyl mercaptan, a too vigorous reaction is easily caused.

The addition amounts of the basic catalyst and alkyl mercaptan which cause the said too vigorous reaction are somewhat different depending upon the reaction temperature.

In the event of employing common amounts of the said basic catalyst and alkyl mercaptan, its employable reaction temperature is desirably chosen in a range of 30°C to 80°C. More desirably the temperature is chosen in a range of 50°C to 70°C.

In the present invention, the manner in which alkyl mercaptan functions is not yet clearly understood but in the process of producing diaminomaleonitrile with a high yield rate and curtailing its reaction time, the said alkyl mercaptan appears to exhibit a catalyst-like behavior.

The addition of thermally treated DMSO instead of alkyl mercaptan also produces the same effect.

As disclosed in the literature, formaldehyde and sulfur compounds such as methyl mercaptan, dimethyl sulfide, dimethyl sulfone, methyl disulfide or the like are known to be decomposition products of dimethyl sulfoxide.

The said same effect, in case of adding thermally treated DMSO is caused by methyl mercaptan contained in said DMSO.

Usually, the distillation of DMSO is carried out under reduced pressure in order to prevent its thermal decomposition. However, in case of adding a thermally treated DMSO into a reaction system instead of alkyl mercaptan, DMSO distilled under atmospheric pressure may be used as an additive, therefore in case of using DMSO as a solvent there is an advantage that the operation for the recovery of the solvent is very easy.

Furthermore, commercially available DMSO is thermally treated and thereby the said DMSO containing its thermally decomposed compound may be employed.

According to the process of the present invention, the reaction can be completely finished within a short time, such as 1 to 2 hours, and further it is surprising that diaminomaleonitrile can be obtained with a high yield rate such as 80 % or more. Such high yield as 80 % has not been achieved previously.

The following examples are intended to aid in the understanding of the invention, and variations may be made by one skilled in the art without departing from the spirit and scope of the invention.

EXAMPLE 1

One hundred and ten grams of dimethyl sulfoxide was charged in a 300 cc air-tight reactor equipped with an agitator and 5.5 g of sodium cyanide and 2.2 g of methyl mercaptan were added and dissolved in it under a simultaneous agitating step.

Subsequently, 33 g of hydrogen cyanide was gradually added in it and its temperature was gradually raised from ambient temperature to 60°C and the reaction was carried out in continuance of 1.5 hours.

After finishing completely the reaction, the resulting reaction solution was analyzed by using a photoelectric spectrophotometer by ultraviolet ray system and its photo-absorption was measured at wave-length of 296 m$\mu$ and thereby, the said reaction solution was analyzed.

As its analysis results, it was identified to have obtained 28.15 g of diaminomaleonitrile. The said diaminomaleonitrile was produced in a 85.3 % yield in proportion to the added hydrogen cyanide.

EXAMPLE 2

One hundred and ten grams of dimethyl formamide was charged into a 300 cc air-tight reactor equipped with an agitator and then, 5.5 g of sodium cyanide and 2.2 g of ethyl mercaptan were added and dissolved in it under a simultaneous agitating step.

Subsequently, 33 g of hydrogen cyanide was gradually added in it and its temperature was gradually raised from common temperature to 60°C, and the reaction was carried out in continuance of 1.5 hours.

After having finished completely the reaction, the resulting reaction compound was analyzed with the same procedure employed for Example 1 and as its analysis results, it was identified to have obtained 26.9 g of diaminomaleonitrile.

The said diaminomaleonitrile was produced in a 81.59 % yield in proportion to the added hydrogen cyanide.

EXAMPLE 3

One hundred and ten grams of hexamethyl phosphoroamide was charged into a 300 cc air-tight reactor equipped with an agitator and then, 8.2 g of sodium cyanide and 2.2 g of octyl mercaptan were added and dissolved in it under a simultanoeus agitating step.

Subsequently, 33 g of hydrogen cyanide was gradually added in it and its temperature was gradually raised from common temperature to 60°C and the reaction was carried out in continuance of 1.5 hours.

After having finished completely the reaction, the resulting reaction solution was analyzed with the same procedure employed for Example 1 and as its analysis results, it was identified to have obtained 25.48 g of diaminomaleonitrile. The said diaminomaleonitrile was produced in a 77.2 % yield in proportion to the added hydrogen cyanide.

EXAMPLE 4

DMSO containing a thermally decomposed material was prepared by distilling DMSO under common pressure. Then, 100 cc of said DMSO was charged in a 300 cc air-tight reactor equipped with an agitator and simultaneously, 4 g of sodium cyanide was added and dissolved in it under an agitating step.

Then, 26.5 g of hydrogen cyanide was gradually added in it and its reaction temperature was gradually raised from common temperature to 60°C and thereby the reaction was carried out in continuance of 2 hours. After finishing completely the reaction, the resulting reaction solution was analyzed with the same procedure employed for Example 1. As its analysis results, it was identified to have obtained 21.3 g of diamino maleonitrile.

The said diamino maleonitrile was obtained in a 80.4 % yield, in proportion to the added hydrogen cyanide.

EXAMPLE 5

Thirty grams of DMSO containing a thermally decomposed compound which was obtained with a thermal treatment of dimethyl sulfoxide around its boiling point for about 1 hour was added in 80 g of dimethyl formamide.

As a solvent and alkyl mercaptan, 110 g of the resulting mixture were charged in a 300 cc air-tight reactor equipped with an agitator and further, 4 g of sodium cyanide was added and dissolved in it under a simultaneous agitating step.

Subsequently, 28.3 g of hydrogen cyanide was gradually added in it and its reaction temperature was gradually raised from common temperature to 60°C and its reaction was carried out in continuance of 2 hours.

After finishing completely the reaction, the same analysis procedure employed for Example 1 was applied to the resulting reaction solution and as its results, 20.1 g of diamino maleonitrile was obtained. The said diamino maleonitrile was produced in a 71.2 % yield in proportion to the added hydrogen cyanide.

What is claimed is:

1. In a process for the production of diaminomaleonitrile by tetramerization of hydrogen cyanide in a nonprotonic polar solvent selected from the group consisting of dimethylsulfoxide, dimethylformamide, dimethylacetoamide, hexamethylphosphoroamide and mixtures thereof, in the presence of a basic catalyst selected from the group consisting of alkali cyanide, alkali hydroxide, ammonia, trialkylamine and mixtures thereof, the improvement which comprises tetramerizing hydrogen cyanide at a temperature ranging from 15°C to 100°C in the presence of at least one alkylmercaptan containing 1 to 8 carbon atoms wherein the amount of said alkylmercaptan is in the range of 0.1 to 8 weight percent of the amount of non-protonic polar solvent.

2. A process according to claim 1 wherein alkylmercaptan is methylmercaptan.

3. A process according to claim 1 wherein the alkylmercaptan is ethylmercaptan.

4. A process according to claim 1 wherein the amount of alkylmercaptan is in the range of 0.5 to 2.5 weight percent of the weight of non-protonic polar solvent.

5. A process according to claim 1 wherein the amount of the basic catalyst is in the range of 0.1 to 15 weight percent of the weight of non-protonic polar solvent.

6. A process according to claim 5 wherein the amount of the basic catalyst is in the range of 2.5 to 7.5 weight percent of the weight of non-protonic polar solvent.

7. A process according to claim 5 wherein the temperature is in the range of 30°C to 80°C.

8. A process according to claim 7 wherein the temperature is in the range of 50°C to 70°C.

9. A process according to claim 8 carried out for 1 to 2 hours.

* * * * *